(12) United States Patent
Suzuki et al.

(10) Patent No.: US 8,875,547 B2
(45) Date of Patent: Nov. 4, 2014

(54) WASHING MACHINE, AND OZONE GENERATOR

(75) Inventors: Masami Suzuki, Osaka (JP); Akihiro Hosokawa, Osaka (JP)

(73) Assignees: Haier Group Corporation, Shandong (CN); Qingdao Haier Washing Machine Co., Ltd., Shandong (CN)

( * ) Notice: Subject to any disclaimer, the term of this patent is extended or adjusted under 35 U.S.C. 154(b) by 1453 days.

(21) Appl. No.: 12/087,520

(22) PCT Filed: Dec. 19, 2006

(86) PCT No.: PCT/JP2006/325299
§ 371 (c)(1),
(2), (4) Date: Jul. 9, 2008

(87) PCT Pub. No.: WO2007/080755
PCT Pub. Date: Jul. 19, 2007

(65) Prior Publication Data
US 2009/0007601 A1 Jan. 8, 2009

(30) Foreign Application Priority Data

Jan. 10, 2006 (JP) ................................. 2006-002431

(51) Int. Cl.
*D06F 39/08* (2006.01)
*C01B 13/11* (2006.01)
*D06F 35/00* (2006.01)
*C02F 1/78* (2006.01)
*C02F 103/00* (2006.01)

(52) U.S. Cl.
CPC .................. *C01B 13/115* (2013.01); *C02F 1/78* (2013.01); *C02F 2103/002* (2013.01); *C01B 2201/62* (2013.01); *C01B 2201/22* (2013.01); *C02F 2201/782* (2013.01); *D06F 35/001* (2013.01)
USPC ....................................................... 68/12.13

(58) Field of Classification Search
USPC ......................................................... 68/12.13
See application file for complete search history.

(56) References Cited

U.S. PATENT DOCUMENTS

2005/0214182 A1* 9/2005 Lu ............................ 422/186.07

FOREIGN PATENT DOCUMENTS

| CN | 1127314 A | 7/1996 |
|---|---|---|
| CN | 2410283 Y | 12/2000 |
| CN | 2481735 Y | 3/2002 |
| JP | 1-275403 | 11/1989 |

(Continued)

OTHER PUBLICATIONS

English machine translation of JP3102622U.*

*Primary Examiner* — Michael Kornakov
*Assistant Examiner* — Jason Riggleman
(74) *Attorney, Agent, or Firm* — Rabin & Berdo, P.C.

(57) ABSTRACT

Provided is an ozone generator (47) including two sheets of ozone generating electrodes (156, 157). These two ozone generating electrodes (156, 157) are arranged in a treating passage (152) in series along an air flowing direction. Thus, the air to come in from an air inlet port flows at first along the ozone generating electrode (156) of the first sheet, and receives, while flowing, the creeping discharge of the first ozone generating electrode (156) thereby to generate the ozone. The air thus having generated the ozone further flows in the treating passage (152) to the ozone generating electrode (157) of the second sheet, and receives, while flowing, the creeping discharge of the second ozone generating electrode (157) thereby to generate the additional ozone. The highly dense ozone can be used to clean the washing water.

11 Claims, 5 Drawing Sheets

(56) References Cited

FOREIGN PATENT DOCUMENTS

| JP | 2001-70770 A | * | 3/2001 | ................ | B01F 1/00 |
| JP | 2001-286698 | | 10/2001 | | |
| JP | 2002-320792 | | 11/2002 | | |
| JP | 2002-320792 A | * | 11/2002 | .............. | D06F 39/00 |
| JP | 2003236287 A | * | 8/2003 | .............. | D06F 17/12 |
| JP | 3102622 | | 4/2004 | | |
| JP | 3102622 U | * | 4/2004 | .............. | C01B 13/11 |
| JP | 2005-089238 | | 4/2005 | | |
| JP | 2005-124626 | * | 5/2005 | .............. | D06F 39/08 |

\* cited by examiner

WASHING MACHINE, AND OZONE GENERATOR

TECHNICAL FIELD

The present invention relates to a washing machine (electric washing machine), and more particularly, it relates to a washing machine including a mechanism purifying water used for washing with ozone. The present invention also relates to an ozone generator for purifying such water employed for purification, sterilization, deodorization etc.

PRIOR ART

A washing machine capable of recycling water, formed by providing a water storage tank in a housing separately from a washing tub for reserving water used in the washing tub in the water storage tank so that the water can be reused in the washing tub is proposed in Japanese Unexamined Patent Publication No. 2005-124626 (Patent Document 1).

DISCLOSURE OF THE INVENTION

Problems to be Solved

The washing machine described in the Patent Document 1 has such a disadvantage that the same merely filtrates the water with a lint capturing means when reserving the water in the water storage tank and cannot sufficiently purify the water.

In the washing machine having the water storage tank as described in the Patent Document 1, therefore, it is conceivable to purify the water reserved in the water storage tank with ozone. In this case, an ozone generator for generating the ozone must be incorporated into the housing of the washing machine. The ozone generator generates the ozone by silent discharge in general, and hence a high voltage is applied thereto. In consideration of safety, therefore, the ozone generator must be arranged in a state untouchable by the user when the user operates the washing machine or performs simple maintenance.

While the washing machine is a machine treating water, a discharge electrode of the ozone generator cannot generate ozone if wet with the water or supplied with highly humid air. In the housing of the washing machine, therefore, the ozone generator must be provided in a state isolated from water wetting.

Further, the water storage tank is also arranged in the housing of the washing machine in addition to the washing tub, and only a small-sized ozone generator can be arranged in the housing having a limited internal volume.

The present invention has been proposed under such circumstances, and a main object thereof is to provide a washing machine having an ozone generator in which a countermeasure against water wetting is taken with high safety.

Another object of the present invention is to provide a washing machine having a mechanism purifying washing water into which a small-sized ozone generator having excellent ozone generating efficiency is incorporated.

Still another object of the present invention is to provide an ozone generator utilizable for purification, sterilization, deodorization etc., also applicable to an apparatus other than the washing machine.

Solutions to the Problems

The present application discloses a washing machine comprising a housing constituting the outer shell of the washing machine; a washing tub provided in the housing for reserving water and storing and washing clothes; a tank provided in the housing for reserving the water discharged from the washing tub after used in the washing tub; and a purifying means for purifying the water reserved in the tank, wherein the purifying means includes an ozone generator for generating ozone by discharge, the ozone generator comprises: a casing having an air inlet port, an ozone outlet port and a treating passage formed between the air inlet port and the ozone outlet port; an ozone generating electrode provided in the treating passage for generating ozone by performing creeping discharge on air flowing through the treating passage; a frame for holding the casing on an upper portion; an electric circuit board arranged in the frame for performing energization control on the ozone generating electrode; and a connecting portion facing into the frame for connecting the electric circuit board and the ozone generating electrode with each other, and fire-retardant insulating resin is filled in the frame to seal the electric circuit board and the connecting portion.

The present application discloses a washing machine comprising: a housing constituting the outer shell of the washing machine; a washing tube provided in the housing for storing and washing clothes; and an ozone generator for deodorizing and sterilizing the clothes by supplying ozone to the clothes stored in the washing tub, wherein the ozone generator comprises: a casing having an air inlet port, an ozone outlet port and a treating passage formed between the air inlet port and the ozone outlet port; an ozone generating electrode provided in the treating passage for generating ozone by performing creeping discharge on air flowing through the treating passage; a frame for holding the casing on an upper portion; an electric circuit board arranged in the frame for performing energization control on the ozone generating electrode; and a connecting portion facing into the frame for connecting the electric circuit board and the ozone generating electrode with each other, and fire-retardant insulating resin is filled in the frame to seal the electric circuit board and the connecting portion.

The present application discloses a washing machine, wherein the casing includes: a case base forming one side of a case formed by the upper surface of the frame; and a case cap detachably attached to the case base for forming the remaining side of the case.

The present application discloses a washing machine, wherein at least two leaves of ozone generating electrodes are arranged in series along an air flowing direction.

The present application discloses a washing machine, wherein the treating passage includes a turnaround passage having a first half portion guiding air entering from the air inlet port to a first direction and allowing the same to U-turn on an intermediate position and a second half portion guiding the air to a direction opposite to the first direction and discharging the same from the ozone outlet port.

The present application discloses a washing machine, wherein the air inlet port and the ozone outlet port are arranged adjacent to each other.

The present application discloses a washing machine, wherein two ozone outlet ports are provided.

The present application discloses an ozone generator for performing purification, sterilization, deodorization etc., comprising: a casing having an air inlet port, an ozone outlet port and a treating passage formed between the air inlet port and the ozone outlet port; an ozone generating electrode for generating ozone in the treating passage by performing creeping discharge on air flowing through the treating passage; a frame for holding the casing on an upper portion; an electric circuit board arranged in the frame for performing energization control on the ozone generating electrode; and a connecting portion facing into the frame for connecting the electric circuit board and the ozone generating electrode with each other, and fire-retardant insulating resin is filled in the frame to seal the electric circuit board and the connecting portion.

The present application discloses an ozone generator, wherein at least two leaves of ozone generating electrodes are arranged in series along an air flowing direction, and the ozone generator has a check valve inserted between the treating passage and the ozone outlet port for allowing the air to flow from the treating passage to the ozone outlet port but preventing water from entering into the treating passage from the ozone outlet port.

The present application discloses an ozone generator, wherein the treating passage includes a turnaround passage having a first half portion guiding air entering from the air inlet port to a first direction and allowing the same to U-turn on an intermediate position and a second half portion guiding the air to a direction opposite to the first direction and discharging the same from the ozone outlet port.

Effect of the invention

In the present application, the electric circuit board performing energization control of the ozone generating electrode is stored in the frame supporting the casing for ozone generation, and the connecting portion for connecting the electric circuit board and the ozone generating electrode with each other faces into the same. The electric circuit board and the connecting portion are sealed with the fire-retardant insulating resin. Therefore, an ozone generator improved in both of water wetting and insulation performance and compact as a whole is implemented.

In the present application, the ozone generating electrode requiring maintenance due to aged deterioration following use can be exposed by detaching the case cap from the case base. Therefore, a compact ozone generator having excellent maintainability can be provided.

As disclosed in the present application, at least two leaves of ozone generating electrodes are provided on the ozone generator. The two leaves of ozone generating electrodes are arranged in the treating passage in series along the air flowing direction. Therefore, the air entering from the air inlet port first flows along the surface of the first ozone generating electrode, and receives creeping discharge of the first ozone generating electrode to generate ozone in this period. Then, the air generating the ozone further flows in the treating passage toward the second ozone generating electrode, and receives creeping discharge to further generate ozone when flowing along the second ozone generating electrode.

Thus, two-stage ozone generation treatment can be performed on the air flowing in the treating passage by the two leaves of ozone generating electrodes arranged in series along the air flowing direction. Therefore, high concentration ozone gas flows out from the outlet.

Even if factors (ammonia gas, insulating small foreign matter etc., for example) hindering generation of the ozone contained in the air entering from the air inlet port adhere to one of the electrodes, particularly the electrode closer to the air inlet port to slightly deteriorate the ozone generating ability of this electrode, the other electrode continues a constant quantity of ozone generation, and hence the ozone generator can be used over a long period in a maintenance-free manner.

When at least two leaves of ozone generating electrodes are arranged in the treating passage in series, the passing air receives the creeping discharge twice to excellently generate the ozone, while the number of the ozone generating electrodes is not restricted to two but not less than three ozone generating electrodes may be arranged in series.

In the present application, the treating passage includes the turnaround passage. Therefore, a compact treating passage in which the two ozone generating electrodes are arrangeable in series can be constituted in the casing without increasing the length of the casing. In other words, the treating passage for arranging the two leaves of ozone generating electrodes can be compactly formed without lengthening the same.

In the present application, the air inlet port and the ozone outlet port are adjacent to each other, with such an advantage that the direction for mounting the ozone generator can be easily decided.

In the present application, the ozone can be supplied from the two ozone outlet ports to different places in the washing machine respectively. For example, the ozone flowing out from one of the ozone outlet ports can be employed for purifying the water in the tank, while the ozone flowing out from the other ozone outlet port can be employed for deodorizing and sterilizing the clothes in the washing tub.

In the present application, a compact ozone generator capable of generating ozone having high concentration, capable of preventing the ozone generating electrodes from wetting when utilized for water purification, for example, and having high reliability can be provided.

More specifically, the ozone outlet port of the ozone generator employed for water purification is connected to a tank or the like reserving the water to be purified, or connected to a water circulating pump. Therefore, there is such a possibility that the water flows backward through the ozone outlet port, the ozone in the treating passage gets wet and the ozone generator cannot generate ozone.

The backwardly flowing water can be prevented from flowing into the treating passage through an ozone supply path by inserting the check valve (non-return valve) between the treating passage and the ozone outlet port, and the ozone generator can be improved in reliability.

In the present application, the two ozone generating electrodes can be excellently arranged in the treating passage without lengthening the treating passage, and a compact ozone generator can be implemented.

Figure 1:
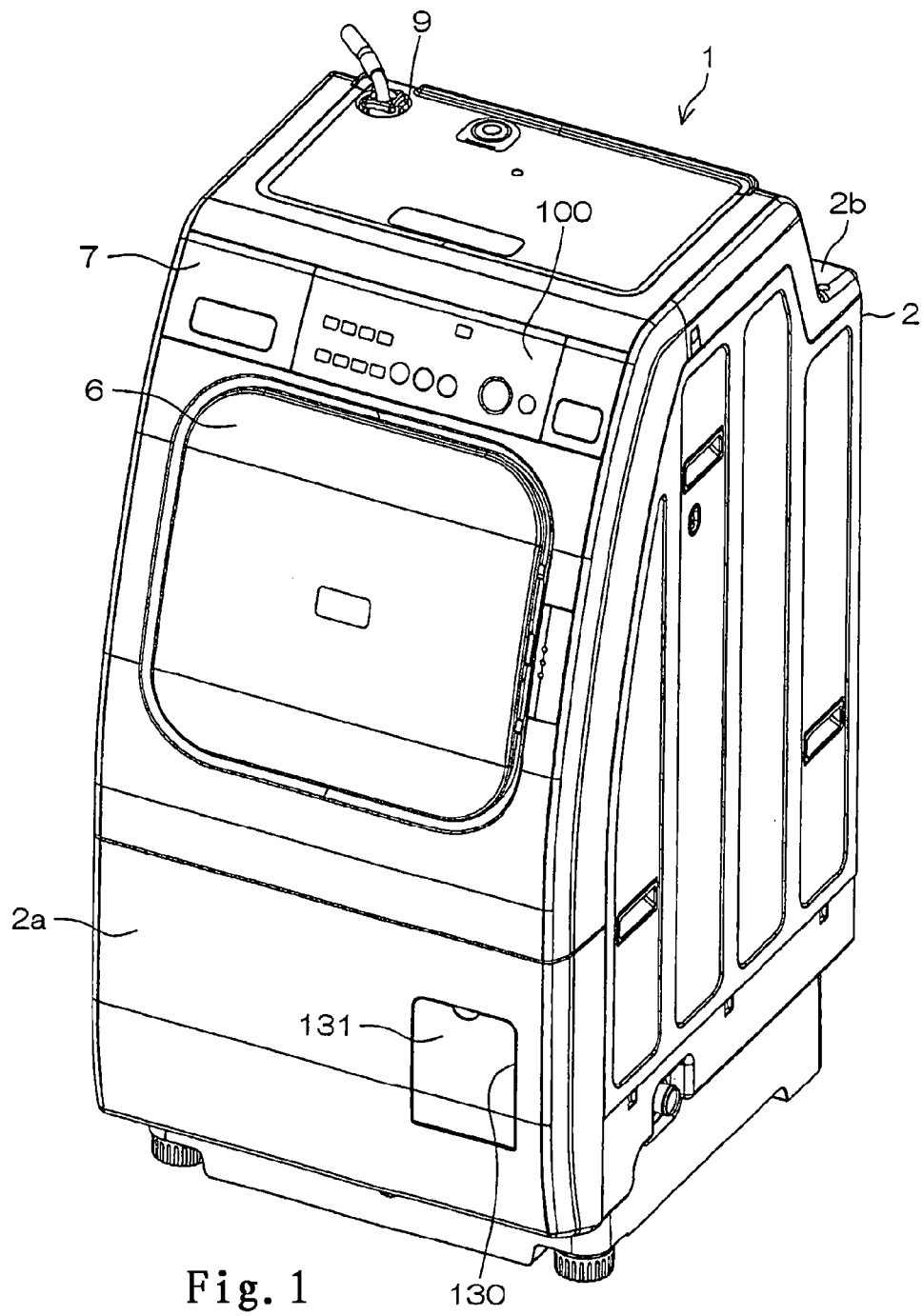
FIG. 1 A perspective view of a washing machine according to an embodiment of the present invention.

DESCRIPTION OF THE REFERENCE NUMERALS 1 washing machine
2 housing
3 drum (washing tub)

4 tank
5 outer tub (washing tub)
47 ozone generator (purifying means)
135 frame
136 casing
138 electric circuit board
142 case base
144 case cap
145 air inlet port
146 first ozone outlet port
147 second ozone outlet port
151 check valve
152 treating passage (white arrow)
156, 157 ozone generating electrode

BEST MODE FOR CARRYING OUT THE INVENTION

An embodiment of the present invention is now specifically described with reference to the drawings.

FIG. 1 is a perspective view of a washing machine according to the embodiment of the present invention, as viewed obliquely from the front upper right.

The outer shell of this washing machine 1 is constituted of a housing 2 somewhat long in the vertical direction. A water inlet 9 is provided on the upper surface of the housing 2, and water supply equipment such as waterworks is connected to this water inlet 9. An operation panel 100 is arranged on a front upper portion of the housing 1. The user can desiredly drive the washing machine 1 by operating the operation panel 100.

A storage portion 7 for storing a detergent and a softening agent is arranged on the left side of the operation panel 100 in a drawable manner.

The lower portion of the front surface of the housing 2 is uprighted, and the front surface is loosely inclined obliquely backward from an intermediate position, as viewed from below. A door 6 is provided on a central portion of the front surface closer to the upper side. The door 6 is in the form of a square having rounded corners as viewed from the front side, and includes a circular seal packing (not shown) for blocking an outer tub 5 described later.

The lower portion of the front surface of the housing 2 is formed by an independently detachable front panel 2a, and the front panel 2a is so detached that the lower front portion of the washing machine 1 is exposed and maintenance of a pump, a changeover valve and a filter unit provided on the lower front portion can be easily performed.

Further, a window 130 is formed on the right side of the front panel 2a, and the window 130 is covered with a lid 131. When the lid 131 is detached, the filter unit is so exposed that lint etc. captured by the filter unit can be easily removed.

A rear portion of the upper surface of the housing 2 forms a low-stage surface 2b lowered by one stage. The height of the housing 2 is relatively large, and hence the upper portion of the housing 2 may interfere with a water tap or the like when this washing machine 1 is to be installed. Therefore, the low step surface 2b is formed on the rear portion of the upper surface, so that the washing machine 1 can be arranged with no hindrance even if the water tap is provided on a low position.

Figure 2:
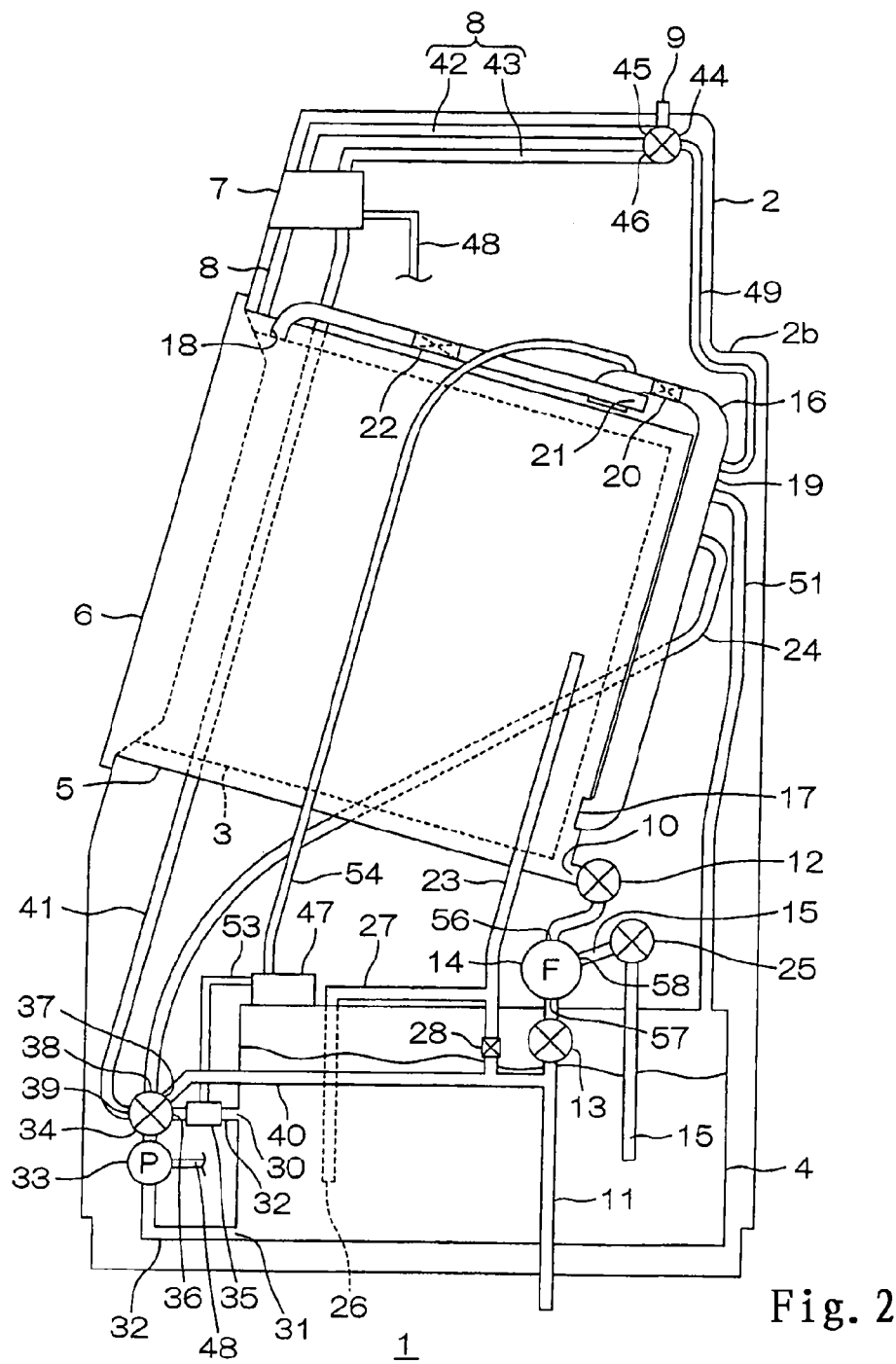
FIG. 2 A schematic side sectional view showing a section of the washing machine according to the embodiment of the present invention cut along a vertical plane along the anteroposterior direction as viewed from a side portion.

FIG. 2 is a schematic side sectional view showing a section of the washing machine according to the embodiment of the present invention cut along a vertical plane along the antero-posterior direction as viewed from a side portion. In relation to the washing machine 1 according to this embodiment and the structural elements (structural components) thereof, the following description is made on the assumption that the left side in FIG. 2 is the front surface (front) side, the right side is the rear surface (rear) side, the upper side is the upper surface (upper) side, the lower side is the bottom surface (lower) side, this side is the right side, and the other side is the left side.

A drum 3 is arranged at the center in the housing 2.

The drum 3 is in the form of a cylinder, and coaxially stored in the identically cylindrical outer tub 5. According to this embodiment, the drum 3 and the outer tub 5 constitute a washing tub, and the front portion of the drum 3 is directed obliquely upward to provide the so-called oblique drum arrangement structure. The front end surfaces of the drum 3 and the outer tub 5 are open, and the door 6 is provided on the front surface of the housing 2 in order to block the same. An unshown motor is provided at the back of the rear end surface of the outer tub 5, and the drum 3 is rotated by the motor (not shown) about the central axis of the drum 3.

A water pipe 8 arranged in the housing 2 is connected to the water inlet 9 provided on the upper surface of the housing 2 through a first changeover valve 44 which is a four-way valve. Another end of the water pipe 8 opposite to the end connected to the water inlet 9 is connected to the uppermost portion of the peripheral wall of the outer tub 5, and the water inlet 9 and the outer tub 5 communicate with each other through the water pipe 8. The storage portion 7 for storing the detergent and the softening agent is arranged on an intermediate position of the water pipe 8.

The storage portion 7 has a box (not shown) drawable frontward from the housing 2, and the box is partitioned into a detergent storage chamber and a softening agent storage chamber. The box is drawn, the detergent and the softening agent are stored in the respective chambers, and the box is shoved, so that the detergent and the softening agent are completely set. When water is supplied from the water pipe 8 to the storage portion 7, the detergent and/or the softening agent stored in the detergent storage chamber and the softening agent storage chamber respectively is dissolved in the water supplied through the water pipe 8 and supplied into the outer tub 5. It is also selectively possible to supply water in which the detergent and/or the softening agent is not dissolved into the outer tub 5.

An end of a priming pipe 48 is connected to a vertical intermediate position of the rear side surface of the storage portion 7. The other end of the priming pipe 48 is connected to a pump 33 provided in the housing 2, to supply priming from the storage portion 7 to the pump 33 when the pump 33 is driven to draw water.

The water pipe 8 branches into a detergent water pipe 42 and a softening agent water pipe 43 at the first changeover valve 44, while the detergent water pipe 42 and the softening agent water pipe 43 join each other at the storage portion 7.

The first changeover valve 44 includes an inlet receiving the water from the water inlet 9, a detergent water outlet 45 linked to the detergent water pipe 42 and a softening agent water outlet 46 linked to the softening agent water pipe 43.

Therefore, it is selectively possible to feed the water entering from the inlet of the first changeover valve 44 from the detergent water outlet 45 to the aforementioned detergent storage chamber of the storage portion 7 through the detergent water pipe 42 or from the softening agent water outlet 46 to the aforementioned softening agent storage chamber of the storage portion 7 through the softening agent water pipe 43 by switching the first changeover valve 44.

Washing and spin-drying in this washing machine 1 are now specifically described. The door 6 is opened to introduce clothes to be washed into the drum 3 from the front side of the housing 2. After the door 6 is closed, the water from the water pipe 8 is reserved in the outer tub 5 in washing. While the outer tub 5 is constituted in an airtight and fluid-tight manner, a large number of pores are formed on the peripheral surface of the drum 3. When the water is reserved in the outer tub 5, therefore, the reserved water also enters into the drum 3, so that the water for washing is reserved also in the drum 3. An unshown baffle is protrusively provided on a proper portion of the inner peripheral surface of the drum 3.

When the drum 3 is rotated by the motor (not shown), the water-containing clothes in the drum 3 are lifted by the baffle (not shown) and subjected to the so-called beat washing with gravity drop.

A backwardly open exhaust port 10 is formed on the lowermost end, i.e., the lower portion of the rear end surface of the outer tub 5, and an exhaust valve 12 is mounted on the rear side thereof. A downwardly extending drainpipe 11 is connected to the exhaust valve 12, and a filter unit 14 and a second changeover valve 13 are interposed on an intermediate position thereof in this order. A branch pipe 15 as a tank channel is connected to the filter unit 14 independently of the exhaust pipe 11, and it is possible to select whether to continuously discharge the water passing through the filter unit 14 from the housing 2 along the exhaust pipe 11 or to discharge the same to the branch pipe 15 by switching the second changeover valve 13.

The positions of the exhaust port 10 and the exhaust valve 12 can be rendered generally equal to the height of the lowermost end of the outer tub 5 by opening the exhaust port 10 toward the rear portion of the outer tub 5 and arranging the exhaust valve 12 at the back thereof. Thus, the exhaust port 10 and the exhaust valve 12 do not enter into the arrangement space for various structural elements arranged under the outer tub 5, but the arrangement space for the various structural elements can be widely ensured. Particularly when the washing machine 1 is driven, the outer tub 5 so vibrates that the exhaust valve 12 also vibrates following the vibration of the outer tub 5 if the exhaust port 10 and the exhaust valve 12 fixed to the outer tub 5 protrude downward beyond the outer tub 5, and hence the lower space must be ensured in consideration of this vibration. According to this embodiment, the exhaust port 10 and the exhaust valve 12 are arranged through the rear portion of the outer tub 5, whereby the lower space of the outer tub 5 can be excellently used for arranging the remaining structural elements.

When the exhaust valve 12 and the second changeover valve 13 are rendered "open", the water in the outer tub 5 is discharged from the housing 2. When the exhaust valve 12 is rendered "open" and the second changeover valve 13 is rendered "closed", on the other hand, the water in the outer tub 5 flows out to the branch pipe 15 through the filter unit 14.

After the water in the outer tub 5 is discharged, the drum 3 is spin-dry-rotated (high-speed-rotated) by the motor (not shown), and moisture contained in the clothes is eliminated.

The washing machine 1 according to this embodiment can perform drying, in addition to washing and spin-drying. Therefore, an outlet 17 of a dry air duct 16 is connected to the lower portion of the rear end surface of the outer tub 5. The dry air duct 16 extends obliquely upward along the rear end surface of the outer tub 5, reaches the front side along the upper portion of the outer tub 5 and extends frontward along the upper peripheral surface of the outer tub 5, and the forward end thereof is connected to the front peripheral surface of the outer tub 5 as an inlet 18. Thus, the outer tub 5 and the dry air duct 16 communicate with each other. The region of this dry air duct 16 extending obliquely upward along the rear end surface of the outer tub 5 functions as a dehumidifying pipe 19. The clothes are so dried that the moisture contained in the clothes is vaporized into steam, and the high-temperature humid air in the drum 3 containing this steam outgoes from the outlet 17 and moves upward in the dehumidifying pipe 19. At this time, water supplied from a heat exchanger water pipe 49 is dropped in the dehumidifying pipe 19. More specifically, an end of the heat exchanger water pipe 49 is connected to the first changeover valve 44, and the other end thereof is connected to the upper portion of the dehumidifying pipe 19. Therefore, the first changeover valve 44 is so switched that the water from the water inlet 9 is dropped from the heat exchanger water pipe 49 into the dehumidifying pipe 19. Water can be supplied into the dehumidifying pipe 19 also from a heat exchanger tank water pipe 24 as a dehumidifying water channel, independently of the heat exchanger water pipe 49.

When the water is dropped in the dehumidifying pipe 19, this water and the high-temperature humid air perform heat exchange, to cool and dehumidify the high-temperature humid air. The water and moisture liquefied upon dehumidification drop in the dehumidifying pipe 19, and thereafter reach the exhaust port 10 from the outlet 17 through the outer tub 5.

In the dry air duct 16, a filter 20 is interpolated on the downstream side of the dehumidifying pipe 19 as viewed along the air flowing direction, and a blower 21 is further provided on the downstream side thereof. The blower 21 is so rotated that the air in the drum 3 outgoes from the outlet 17, is moved in the dry air duct 16, and supplied into the drum 3 from the inlet 18 again. A heater 22 is interpolated in the dry air duct 16 on the downstream side of the blower 21. The air passing through the dry air duct 16 is dehumidified in the dehumidifying pipe 19, thereafter heated by the heater 22, and supplied to the drum 3 from the inlet 18.

A tank 4 is provided under the drum 3. This tank 4 is a tank having a closed structure, for reserving the water after the same is reserved in the outer tub 5 and used. In order to guide the water from the outer tub 5 to the tank 4, the other end of the branch pipe 15 opposite to the end connected to the filter unit 14 opens in the tank 4. More specifically, a water storage valve 25 is interposed in an intermediate position of the branch pipe 15, the branch pipe 15 extends obliquely upward from the filter 14 toward the water storage valve 25 in the range from the filter 14 up to the water storage valve 25 and extends downward from the water storage valve 25 to pass through the upper surface of the tank 4, while the other end of the branch pipe 15 is arranged on a vertically intermediate position in the tank 4.

Therefore, the second changeover valve 13 is closed while the exhaust valve 12 and the water storage valve 25 are opened, so that the water of the outer tub 5 is guided into the tank 4.

An end of an air vent hose 51 is connected to the tank 4. The air vent hose 51 extends upward from the tank 4 through the rear portion of the outer tub 5, and the other end thereof is connected to the upper portion of the dehumidifying pipe 19. Thus, the tank 4 and the dry air duct 16 communicate with each other.

The tank 4 includes a pressure-regulating drainpipe 27 as an overflow channel (tank overflow channel) having an inlet 26 opening in the tank 4. A check valve 28 is intercalated into an intermediate position of the pressure-regulating drainpipe 27. An outlet side of the pressure-regulating drainpipe 27 joins the drainpipe 11 on the downstream side of the second changeover valve 13.

An overflow pipe 23 as a washing tub overflow channel is connected to the pressure-regulating drainpipe 27. When water is supplied into the outer tub 5 in excess of a prescribed quantity, therefore, the water exceeding the prescribed quantity overflows the outer tub 5 through the overflow pipe 23, and is discharged from the machine through the drainpipe 11.

The tank 4 is provided with a circulating pipe 32 connecting an outlet 31 and an inlet 30 formed on the side portion thereof with each other, in order to circulate the water reserved in the tank 4. A pump 33, a third changeover valve 34 and an ejector 35 are inserted into the circulating pipe 32 successively from the outlet 31 toward the inlet 30 along the circulating direction of the water.

The third changeover valve 34 is a five-way valve, and switches the water discharged from the pump 33 to flow in from one direction to flow out to any one of four directions. In other words, the third changeover valve 34 has a first outlet 36 for returning the water from the inlet 30 to the tank 4 through the ejector 35, a second outlet 37, a third outlet 38 and a fourth outlet 39.

A tank drainpipe 40 is linked to the second outlet 37, and the tank drainpipe 40 joins the pressure-regulating drainpipe 27 on the downstream side of the check valve 28.

An end of the aforementioned heat exchanger tank water pipe 24 is connected to the third outlet 38. The other end of the heat exchanger tank water pipe 24 is connected to the upper portion of the dehumidifying pipe 19.

An end of a tank water pipe 41 as a recycling water channel is linked to the fourth outlet 39, and the other end of the tank water pipe 41 is connected to the water pipe 8 through the storage portion 7.

Therefore, it is possible to draw the water from the tank 4 with the pump 33 and circulate the same through the circulating pipe 32 by switching the third changeover valve 34.

Further, it is possible to draw the water from the tank 4 with the pump 33 and discharge the same from the machine through the tank drainpipe 40, the pressure-regulating drainpipe 27 and the drainpipe 11 by switching the third changeover valve 34.

Further, it is possible to draw the water from the tank 4 with the pump 33 and supply the same to the dehumidifying pipe 19 through the heat exchanger tank water pipe 24 for performing heat exchange between this water and the high-temperature humid air in the pipe 19 and cooling and dehumidifying the high-temperature humid water by switching the third changeover valve 34.

In addition, it is possible to draw the water from the tank 4 with the pump 33, feed the same from the tank water pipe 41 to the water pipe 8 and reserve the same in the outer tub 5 for recycling the same for the washing by switching the third changeover valve 34.

An ozone generator 47 is provided in the vicinity of the tank 4. The ozone generator 47 generates ozone (ozone gas) by performing creeping discharge on air incorporated through an unshown filter. The air passing through the ozone generator 47 contains the ozone gas.

According to this embodiment, the air containing the ozone output from the ozone generator 47 is supplied to the ejector 35 through a first feed passage 53. The ozone supplied through the first feed passage 53 is mixed into the circulated water in the tank 4 through the ejector 35. More specifically, the air containing the ozone supplied from the first feed passage 53 is mixed into the water as fine bubbles in the ejector 35, due to a negative pressure formed when the water passes through the ejector 35. If coloring matter, an odor component and various bacteria are contained in the water, these are oxidized by the ozone, and the water in the tank 4 is decolorized, deodorized and sterilized.

When the ozone is continuously supplied to the water in the tank 4 through the ejector 35, the pressure in the tank 4 increases following the supply of the ozone, and the water is extruded from the tank 4 by the supplied ozone. Not only the ozone but also the air containing the ozone is output from the ozone generator 47, and hence this air containing the ozone is mixed into the water as fine bubbles in the ejector 35. In the fine bubbles mixed into the water, the ozone disappears in the water due to oxidation, while the air is gradually reserved in the upper portion of the tank 4, to pressurize the water in the tank 4. While part of the air in the tank 4 is released to the dry air duct 16 by the air vent hose 51, the water in the tank 4 is discharged from the housing 2 from the inlet 26 through the pressure-regulating drainpipe 27 and the drainpipe 11 when the air pressure in the tank 4 rises. The quantity of the discharged water varies with the quantity of the ozone supplied to the tank 4.

The discharged water is the water purified by the supplied ozone, and the ozone has disappeared due to the oxidation. Therefore, the discharged water is purified innoxious water.

As described above, the pressure-regulating drainpipe 27 and the inner part of the outer tub 5 communicate with each other through the overflow pipe 23. Therefore, the water reserved in the tank 4 is merely discharged in response to the difference between the air pressure in the tank 4 and that in the outer tub 5, and the water in the tank 4 can be prevented from excessive discharge from the housing 2.

The air containing the ozone generated in the ozone generator 47 is further supplied to the dry air duct 16 through a second feed passage 54. The supplied position is the downstream side of the filter 20 in the air dry duct 16, and the upstream side of the blower 21 (the suction side of the blower 21). When the blower 21 rotates, the suction side thereof has a negative pressure, and the air containing the ozone is sucked into the blower 21 through the second feed passage 54. The ozone is mixed into the air circulated in the dry air duct 16, and supplied to the drum 3 from the inlet 18. The air is circulated in the dry air duct 16 when the clothes in the drum 3 are dried. Therefore, the ozone is supplied to the dried clothes, and the odor component and bacterial components adhering to the clothes are oxidized by the ozone, so that the clothes are deodorized or sterilized.

Thus, the washing machine 1 according to this embodiment uses the ozone generated in the ozone generator 47 in two ways. First, the tank 4 reserves the water used in the drum 3 and the outer tub 5, thereby using the ozone for purification such as decolorization, deodorization and sterilization of the reserved water and decomposition of dirt. Second, separately from the purification of the water, the ozone is supplied to the drum 3 during dry operation, to be used for deodorization and sterilization of the dried clothes. In other words, the clothes stored in the drum 3 can be deodorized and sterilized with the ozone.

The outer tub 5 storing the drum 3 has the fluid-tight and airtight structure, and the ozone generated in the ozone generator 47 circulates between the tank 4 and the outer tub 5 due to such a structure that the tank 4 and the outer tub 5 are connected with each other through the overflow pipe 23 and the air vent hose 51 but does not leak out from the housing 2. Thus, a safe apparatus having no inconvenience in use with no ozonic smell drifting outward can be provided.

Figure 3:
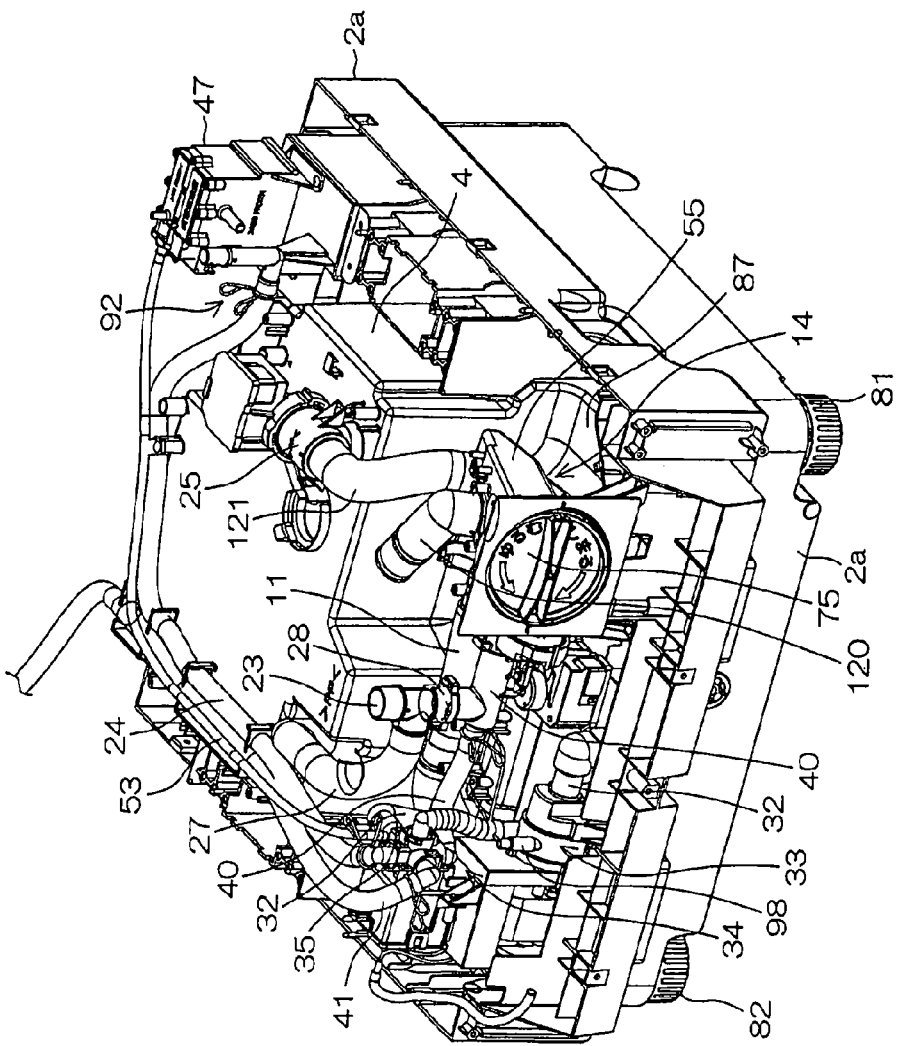
FIG. 3 A perspective view for illustrating an internal structure (arrangement of respective structural elements) of a lower portion of the washing machine according to the embodiment of the present invention.

FIG. 3 is a perspective view for illustrating the internal structure (arrangement/structure of the respective structural elements) of the lower portion of the washing machine 1.

Referring to FIG. 3, the washing machine 1 includes a base housing 2a constituting the lower outer shell of the washing machine 1. The base housing 2a is integrally shaped by resin, for example, and screw legs 81 and 82 for horizontally adjusting the washing machine 1 are provided on the lower ends of the both horizontal sides of the front portion thereof.

In the base housing 2a, the tank 4 is arranged at the center, the filter unit 14 is arranged in the front right of the base housing 2a, the pump 33 and the third changeover valve 34 as the changeover valve are arranged in the front left, and the ozone generator 47 as the purifying means is arranged in the rear right. These respective structural elements as well as hoses and pipes as water channels are efficiently incorporated into the base housing 2a.

In other words, the filter unit 14 s arranged on the front right side of the base housing 2a. The filter unit 14 allows maintenance operation from the front side of the base housing 2a. In other words, an operating section 75 of the filter unit 14 is exposed along the front surface of the base housing 2a. The filter unit 14 has a filter casing 55 longitudinal from the front side toward the rear side, and an outer tub drainpipe 120 (part of the drainpipe 11) communicating with the exhaust port 10 (see FIG. 2) of the outer tub 5 through the exhaust valve 12 is connected to the center of the upper surface of the filter casing 55. The water flowing into the filter casing 55 through the outer tub drainpipe 120 is subjected to first filtration in the filter casing 55, and discharged from the base housing 2a through the drainpipe 11. Further, the water is subjected to second filtration in the filter casing 55, and discharged to the exhaust valve 12 through a tank pipe 121 forming the front half of the branch pipe 15 connected to the depth-side upper surface of the filter casing 55.

Whether to feed the water flowing out from the filter unit 14 to the drainpipe 11 or to the branch pipe 15 is switched by the second changeover valve 13 and the water storage valve 25, as already described.

While the filter unit 14 includes the filter casing 55 extending from the front side to the rear side in this embodiment, a low-stage surface 87 is formed on the front side of the tank 4, and the filter casing 55 is reasonably arranged through a space resulting from the formation of the low-stage surface 87.

The filter casing 55 is arranged on the low-stage surface 87, and hence a tank pipe 121 connecting the rear upper surface of the filter casing 55 and the water storage valve 25 with each other is upwardly linked from the filter casing 55 toward the water storage valve 25. Further, the rear half of the branch pipe extending from the water storage valve 25 into the tank 4 extends perpendicularly downward. When the water valve 25 is closed, therefore, no water is reserved in the branch pipe 15, i.e., in the tank pipe 121 and a rear half downstream-side branch pipe 15b, but the branch pipe 15 can be maintained clean over a long period.

The drain for discharging the water from the tank 4 is the tank drain hose (tank drainpipe) 40 protruding rearward from the third changeover valve 34 to extend rightward, this hose 40 is a joint passage of the overflow channel (pressure-regulating drainpipe) 27 and the washing tub overflow channel (overflow pipe) 23, and communicates with the downstream side of the position where the check valve 28 is provided. Thereafter the hose 40 joins the drainpipe 11. Therefore, the pressure-regulating drainpipe 27, the drainpipe 11 etc. must be arranged on the front side of the tank 4, and a space for setting these drainpipes must be ensured. According to this embodiment, the low-stage surface 87 is provided on the front side of the tank 4 as described above, so as to arrange the pressure-regulating drainpipe 27 and the drainpipe 11 in the vacant space resulting from this low-stage surface 87. Thus, a large number of pipes join one another, or the branched discharge channel can be so arranged that the water excellently unstagnantly flows in the discharge channel.

A vacant region 92 is formed on the rear right side of the tank 4. The ozone generator 47 is arranged through this vacant region 92. The ozone generated in the ozone generator 47 is supplied to a capillary tube 112 of the ejector 35 through a first supply pipe 53 along with the air. FIG. 3 omits the second feed passage 54 (feed passage for supplying the ozone to the circulating air duct 16, refer to FIG. 2) connected to the ozone generator 47.

Figure 4:
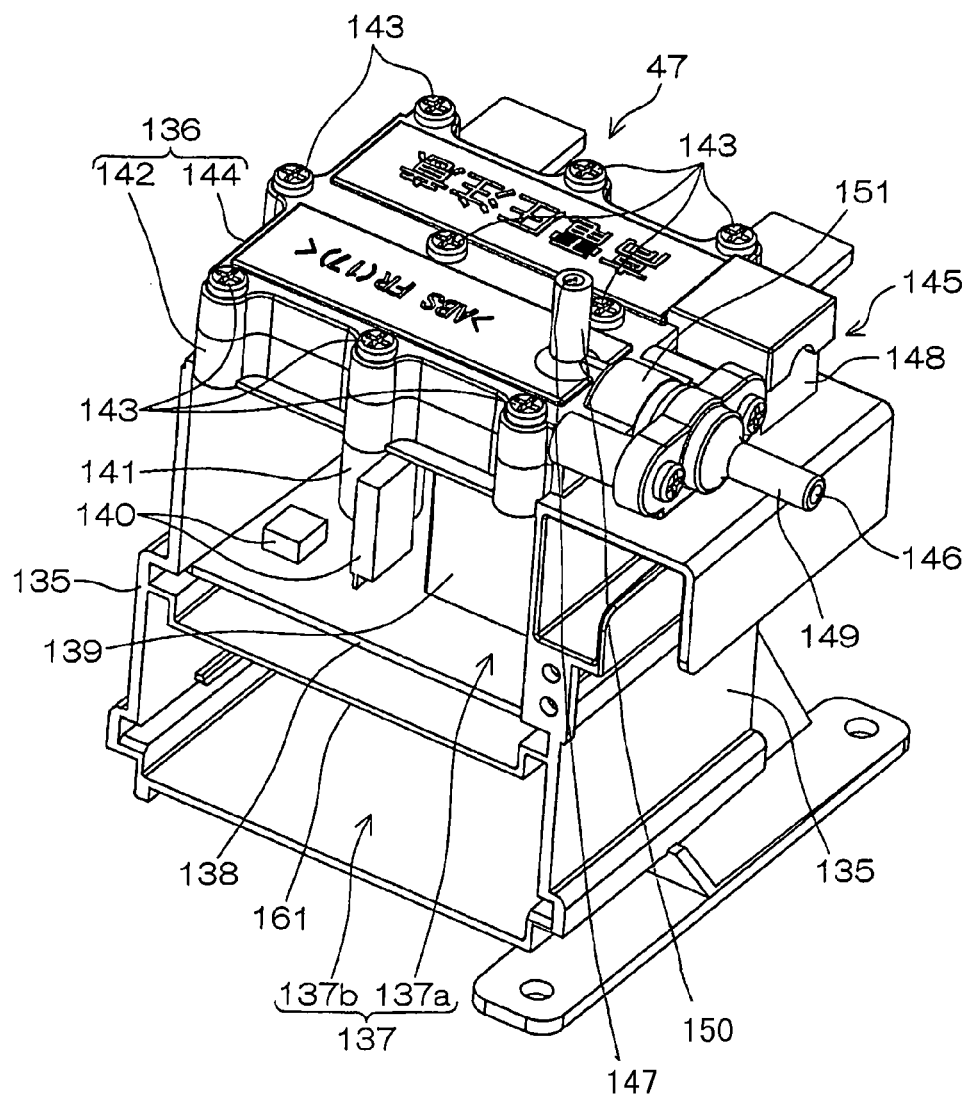
FIG. 4 A perspective view of an ozone generator 47 according to the embodiment of the present invention.

FIG. 4 is a perspective view of the ozone generator 47. While the ozone generator 47 is arranged on the rear right side of the tank 4 as shown in FIG. 3, FIG. 4 is a perspective view showing the ozone generator 47 arranged in this manner as viewed from the rear side.

The ozone generator 47 is described in detail with reference to FIG. 4. The ozone generator 47 includes a frame 135 and a casing 136 mounted on the upper portion of the frame 135. The frame 135 has a space 137 therein, and this space 137 is partitioned into an upper chamber 137a and a lower chamber 137b by a partition plate 161 provided generally at the vertical center. An electric circuit board 138 is stored in a lower portion of the upper chamber 137a. A transformer 139, transistors 140, a capacitor 141 etc. are packaged on the electric circuit board 138. The electric circuit board 138 is a power supply circuit for applying high voltages to ozone generating electrodes (described later) of the ozone generator 47, while unshown wires are provided in the upper chamber 137a and electrically connected to connecting portions with the ozone generating electrodes facing into the upper chamber 137a from the upper surface.

The casing 136 mounted on the frame 135 includes a case base 142 integrally formed with the frame 135 and a case cap 144 mounted on the case base 142 with a plurality of screws 143. The case cap 144 includes an air inlet port 145, a first ozone outlet port 146 and a second ozone outlet port 147. A sponge filter 148 is fitted in the air inlet port 145, so that, if dust or the like is contained in the air flowing into the casing 136 from the air inlet port 145, the sponge filter 148 captures the same. The air inlet port 145 and the first ozone outlet port 146 are adjacently arranged, and both open rightward in FIG. 4. More specifically, the first ozone outlet port 146 opens on the right end of a rightwardly protruding connecting cylinder 149. On the other hand, the second ozone outlet port 147 opens on the upper end of a connecting cylinder 150 protruding upward from the upper surface of the case cap 144 in the vicinity of the first ozone outlet port 146.

Further, a check valve 151 is interposed on the base side of the first ozone outlet port 146, i.e., between the first ozone outlet port 146 and the treating passage. The check valve 151 allows the ozone and the air entering from the air inlet port 145, flowing through the treating passage formed in the casing 136 and flowing out from the first ozone outlet port 146 to pass in this flowing direction, but inhibits the water from penetrating from the first ozone outlet port 146 to enter into the casing 136. Thus, the check valve 151 is incorporated into the ozone generator 47 in relation to the first ozone outlet port 146.

Figure 5:
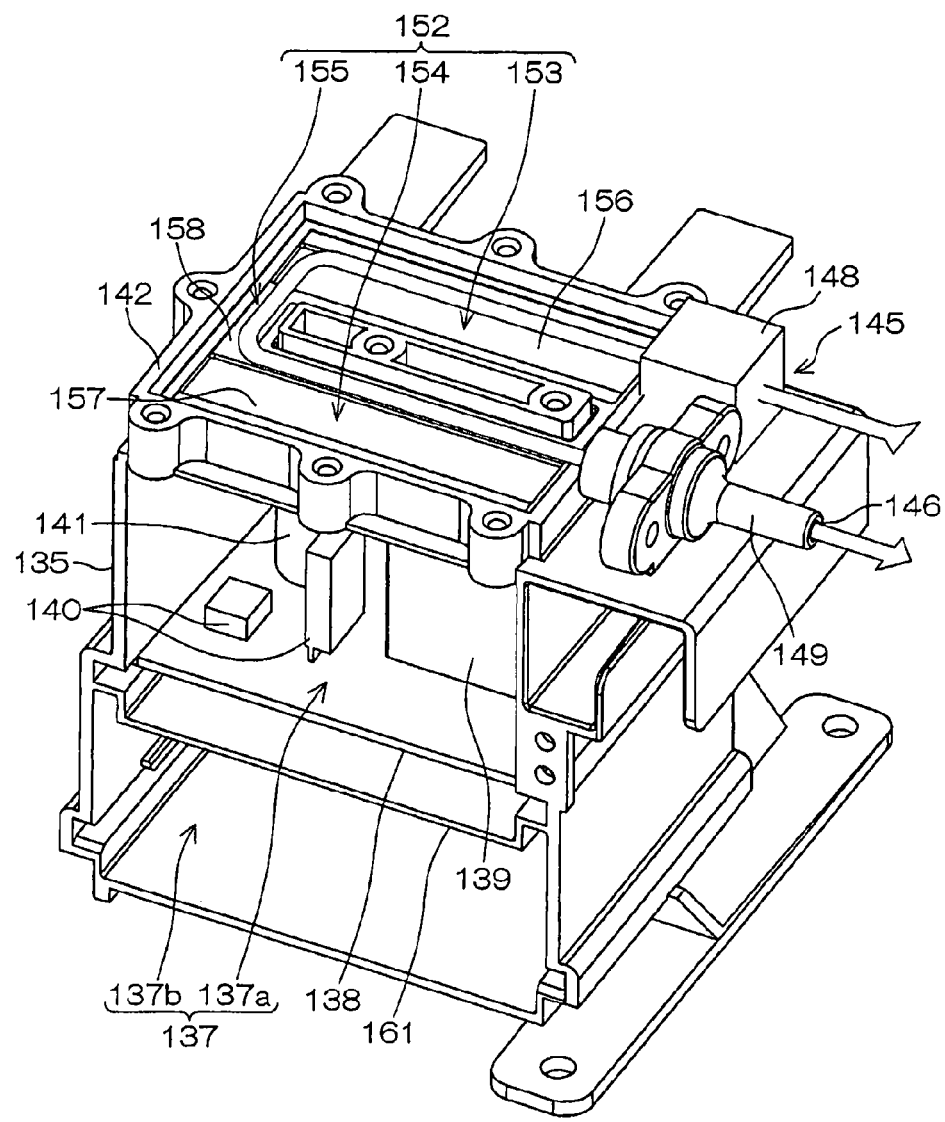
FIG. 5 A perspective view showing states of a treating passage and ozone generating electrodes arranged in the treating passage by detaching a case cap from the ozone generator shown in FIG. 4.

FIG. 5 is a perspective view of the ozone generator 47 shown in FIG. 4 in a state detaching the case cap 144.

FIG. 5 shows the interior of the casing 136. Referring to FIG. 5, illustrated with a white arrow is a treating passage 152 formed in the casing 136. The treating passage 152 is a turnaround passage including a forward path 153, a backward path 154 and a U-turn portion 155 linking the forward path 153 and the backward path 154 with each other, as shown in FIG. 5.

In the forward path 153, a first ozone generating electrode 156 extending in the longitudinal direction thereof is arranged. Also in the backward path 154, a second ozone generating electrode 157 is arranged, to extend in the longitudinal direction thereof. In other words, the two leaves of ozone generating electrodes 156 and 157 are arranged in the treating passage 152 in series along the air flowing direction. The aforementioned electric circuit board 138 applies the high voltages in parallel to these two ozone generating electrodes 156 and 157 respectively.

Thus, when observing the first ozone generating electrode 156 and the second ozone generating electrode 157 from the electric circuit board 138, these two ozone generating electrodes 156 and 157 are electrically connected in parallel with each other, and prescribed high voltages are independently applied from the power circuit board 138 respectively.

When grasping the first ozone generating electrode 156 and the second ozone generating electrode 157 as the arrangement structure in the treating passage 152, on the other hand, the two ozone generating electrodes 156 and 157 are arranged in the space in series. In other words, the first ozone generating electrode 156 and the second ozone generating electrode 157 successively come into contact with the air with respect to the air flowing direction. More specifically, the air flowing in the treating passage 152 flows along the first ozone generating electrode 156, then passes through the U-turn portion 155 and thereafter flows along the second ozone generating electrode 157.

According to this embodiment, both of the first ozone generating electrode 156 and the second ozone generating electrode 157 generate the ozone in the flowing air by creeping discharge. Therefore, the air passing through the treating passage 152 flows while continuously coming into contact with the surfaces of the two ozone generating electrodes 156 and 157, and is discharged as ozone-containing air having sufficiently large concentration when flowing out.

In the treating passage 152, the two ozone generating electrodes 156 and 157 are kept in an excellently isolated state, and a rubber packing 158 is charged into the portion other than the discharge surfaces, for preventing jolting.

Referring again to FIG. 4, fire-retardant and insulating urethane resin is charged into the upper chamber 137a after the electric circuit board 138 is stored and electrically connected with the ozone generating electrodes 156 and 157 on the connecting portions. The urethane resin is so charged into the upper chamber 137a that the electric circuit board 138 and the connecting portions arranged therein are resistant against water wetting and cause no electrical leak.

The ozone generator 47 is arranged in the washing machine in the state shown in FIG. 3, and an end of the first supply pipe 53 is coupled to the connecting cylinder 149, so that the ozone flowing out from the first ozone outlet port 146 is supplied to the aforementioned ejector. Further, an end of the second feed passage 54 is connected to the connecting cylinder 150, in order to supply the ozone to the dry air duct.

In the ozone generator 47 according to this embodiment, the casing 136 storing the ozone generating electrodes and the frame 135 storing the electric circuit components are integrated with each other, and a compact structure is implemented as the whole.

While the space 137 in the frame 135 is partitioned into the upper chamber 137a and the lower chamber 137b and the electric circuit board 138 is arranged only through the upper chamber 137a in this embodiment, the overall space 137 may be utilized for storing the electric circuit board 138 by removing the partition plate 161 when the electric circuit board 138 is large-sized or the like. Alternatively, a more compact structure may be implemented by removing the lower chamber 137b and reducing the vertical size of the frame 135.

The forward path 153 and the backward path 154 are arranged in the treating passage 152 in parallel, the total length of the treating passage 152 can be increased without increasing the length of the casing 136, and the two ozone generating electrodes 156 and 157 are arranged therein in series. Therefore, ozone having high concentration can be generated.

Even if either ozone generating electrode 156 or 157 causes defective energization or defective ozone generation, the remaining ozone generating electrode generates ozone, whereby the ozone generation is not completely interrupted but a highly reliable apparatus can be implemented.

While the ozone generator 47 according to this embodiment has been described as that built into the washing machine 1, the ozone generator 47 is also utilizable for another use. In a case of purifying water with ozone in a water purifying apparatus, for example, the ozone generator 47 according to the present invention is suitable. This is because the ozone generator 47 according to the present invention is subjected to the countermeasure against water wetting, and includes the high-concentration ozone generating mechanism. Further, the ozone generator 47 is also utilizable for purification of water in a dishwasher, sterilization and deodorization of clothes in a cloth drier and the like.

The present invention is not restricted to the aforementioned embodiment, but various modifications are available in the scope of Claims.

The invention claimed is:

1. A washing machine comprising:
   a washing tub for reserving water and storing and washing clothes, including a drum and an outer tub;
   a tank provided under the washing tub and connected to the washing tub, and configured to reserve the water that has been used in the washing tub and that is discharged from the washing tub; and
   an ozone generator configured to generate ozone by discharge;
   wherein the ozone generated by the ozone generator is supplied into the tank to purify the water in the tank and to increase the pressure in the tank so that the water is extruded out of the washing machine through an inlet of the tank via a pressure-regulating drainpipe, which communicates with the washing tub through an overflow pipe, and an exhaust pipe; and
   wherein a dry air duct for drying the clothes communicates with the washing tub and communicates with the tank, and the ozone generated by the ozone generator is supplied into the dry air duct through a feed passage.

2. The washing machine according to claim 1, wherein the ozone generator comprises:
   an air inlet port, an ozone outlet port, and a treating passage formed between the air inlet port and the ozone outlet port;
   an ozone generating electrode provided in the treating passage and configured to generate ozone by performing creeping discharge on air flowing through the treating passage;
   an electric circuit board configured to perform energization control on the ozone generating electrode, the electric circuit board being connected with the ozone generating electrode.

3. The washing machine according to claim 2, wherein the ozone generator comprises a frame and a case mounted on the frame; wherein the electric circuit board is arranged in the frame; and wherein the air inlet port, the ozone outlet port, and the treating passage are arranged in the case.

4. The washing machine according to claim 2, wherein at least one leaf of ozone generating electrode is arranged along an air flowing direction.

5. The washing machine according to claim 2, wherein the treating passage includes a turnaround passage having a first half portion guiding air entering from the air inlet port to a first direction and allowing the same to U-turn on an intermediate position and a second half portion guiding the air to a direction opposite to the first direction and discharging the same from the ozone outlet port.

6. The washing machine according to claim 5, wherein the air inlet port and the ozone outlet port are arranged adjacent to each other.

7. The washing machine according to claim 2, wherein the ozone generator is provided with two ozone outlet ports, one connected to the drum for supplying the ozone into the water and clothes therein and the other connected to the tank for supplying the ozone into the tank.

8. The washing machine according to claim 3, wherein fire-retardant insulating resin is filled in the frame.

9. The washing machine according to claim 2, wherein the ozone generator has a check valve inserted between the treating passage and the ozone outlet port and configured to allow the air to flow from the treating passage to the ozone outlet port but preventing water from entering into the treating passage from the ozone outlet port.

10. The washing machine according to claim 1, further comprising a device configured to substantially prevent water in the tank from excessive discharge.

11. The washing machine according to claim 9, wherein the pressure-regulating drainpipe and the overflow pipe fluidly connect an upper part of the tank with the outer tub.

* * * * *